UNITED STATES PATENT OFFICE.

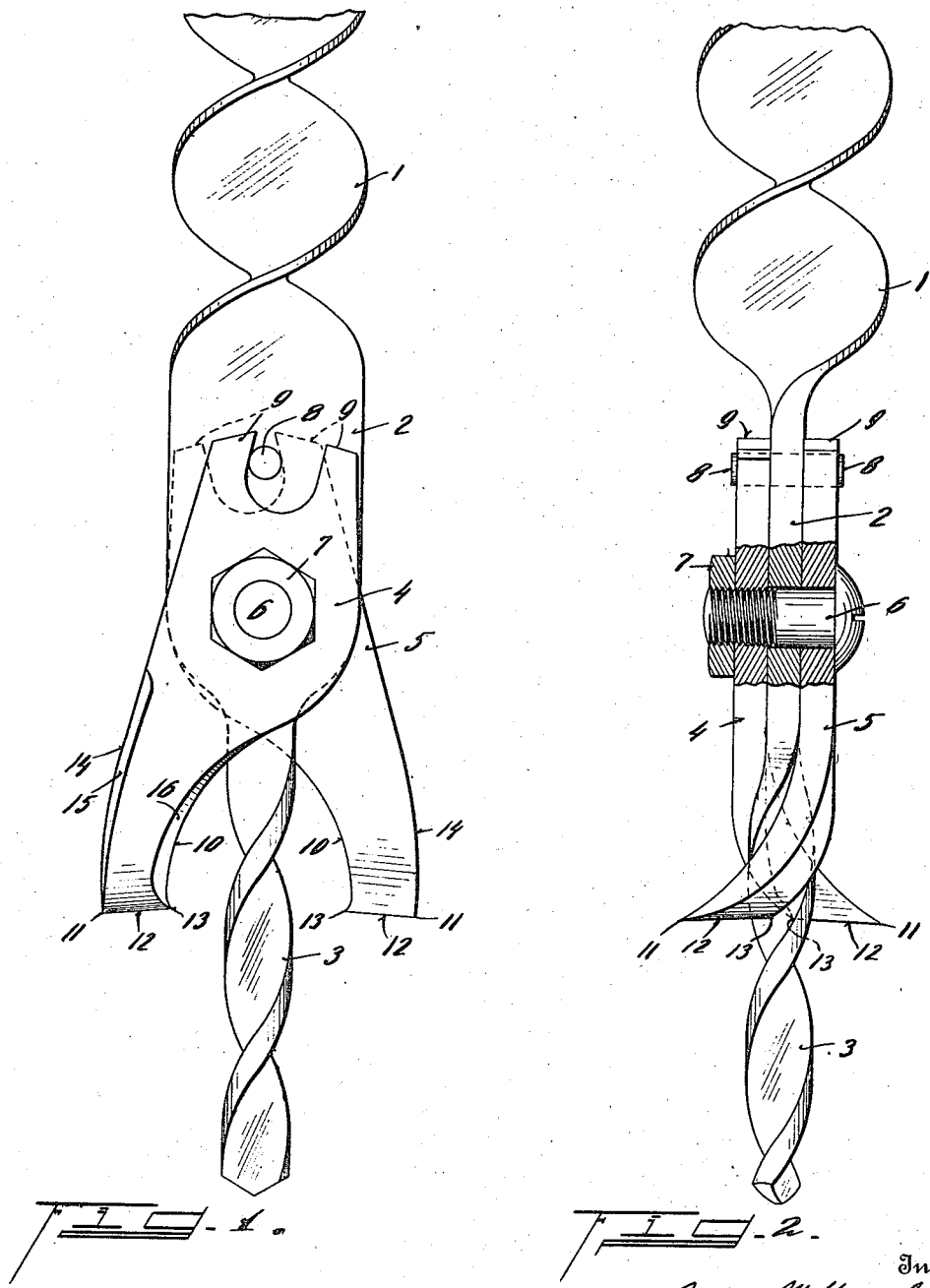

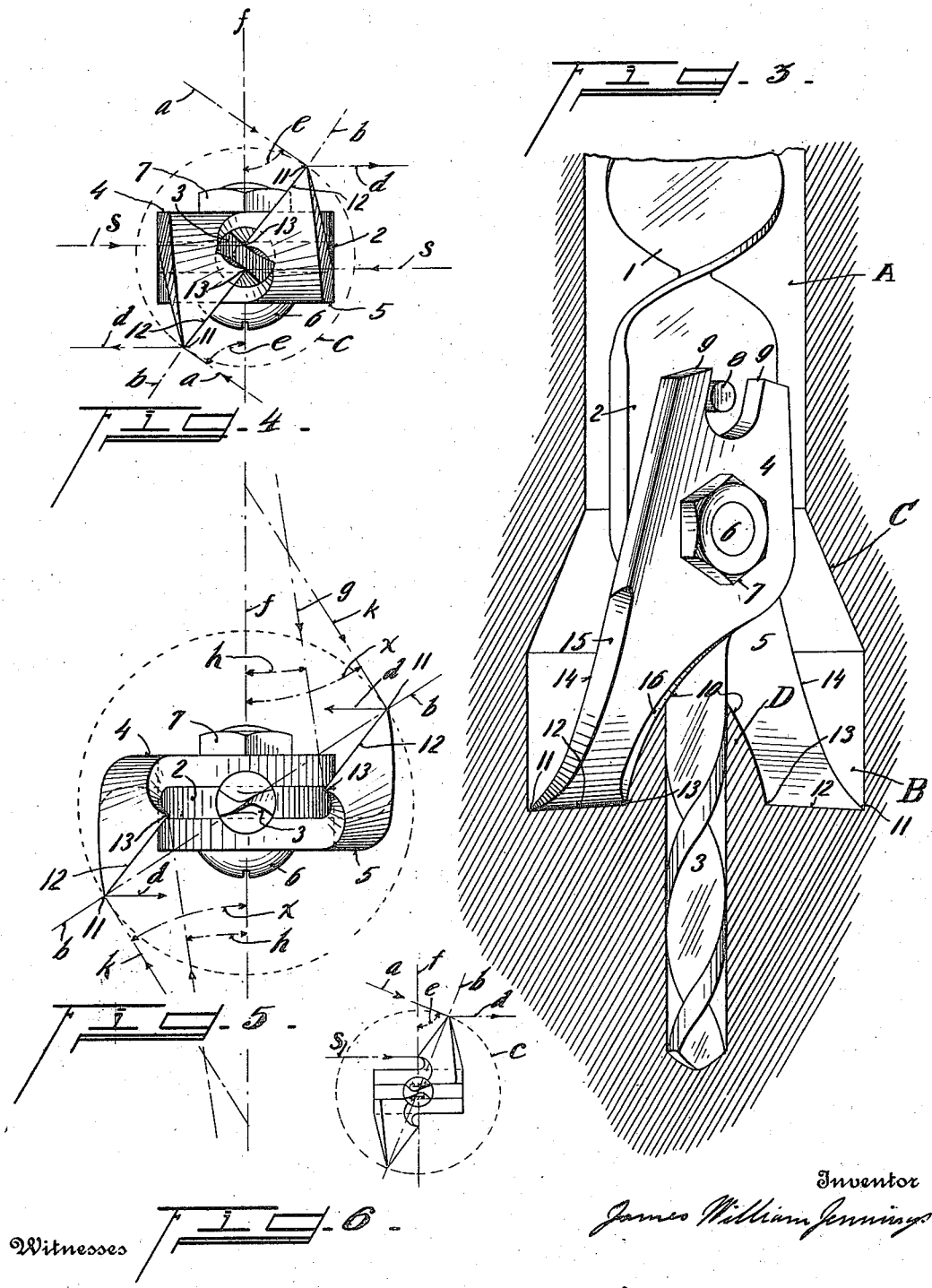

JAMES W. JENNINGS, OF NEW RICHMOND, OHIO.

EXPANDING DRILL.

1,235,569.   Specification of Letters Patent.   Patented Aug. 7, 1917.

Application filed June 25, 1915. Serial No. 36,368.

*To all whom it may concern:*

Be it known that I, JAMES W. JENNINGS, a citizen of the United States, and residing at New Richmond, in the county of Clermont and State of Ohio, have invented a new and useful Improvement in Expanding Drills, of which the following specification is a full disclosure.

My invention relates to mining drills and is more particularly directed to that type of drills used for boring blast-holes for coal mining.

The object of this invention is to provide a drill for chambering blast-holes to provide an enlarged "charge-pocket" at the base thereof.

Another object is to provide an automatically expansible drill having a centering-bit and a pair of cutting jaws, the movements of which are limited in both directions.

Another object is to provide an automatically expanding drill having a pair of cutting jaws formed with tool ends of elongated spiral formation.

A further object is to provide a rotary expansible drill having a shank and a pair of jaws pivoted thereon, the transverse cutting edges of the tool ends of the jaws extending laterally in the direction of rotation.

Another object is to provide an expansible drill having a pair of pivoted jaws controlled in their expanding movements by the disposition of their cutting edges relative to their pivotal axis.

A further object is to provide an expansible rotary drill having a pair of pivoted jaws, the transverse cutting edges of which are laterally projected in the direction of drill rotation and angularly disposed relative to the plane of jaw movement, said angle of disposition being greater than the angle of repose.

Another object is to provide an expansible rotary drill having a pair of jaws terminating with tool ends of elongated spiral formation having transverse cutting edges, which in an expanded position of the jaws are angularly disposed relative to their path of cutting travel, from an outer lead point backwardly, the contour of the tool ends and the angularity of the transverse cutting edges serving conjointly to produce a clean shear cut and elevate the tailings.

The features of the invention will be more fully understood from a description of the accompanying drawings, forming a part of this specification, in which:—

Figure 1 is a front elevation showing the jaws in expanded position.

Fig. 2 is a side elevation, partly in section.

Fig. 3 is a section through the material being bored, showing in perspective the drill in pocket forming position.

Fig. 4 is a bottom plan view, showing the jaws in closed position and the center-bit in section.

Fig. 5 is a bottom plan view, showing the jaws in expanded position.

Fig. 6 is a view similar to Fig. 4, showing the jaws assembled in a reverse position.

Previously, in the drilling and charging of blast-holes for coal mining, it has been the practice to drill a straight hole of about two and one-half inches in diameter and charge said hole with dynamite or other suitable blasting powder to about one-half its depth. A very firm tamping is necessary in this case and at times the charge will "blow out" without producing the desired results.

My improved method contemplates the drilling of a hole A of about two inches in diameter to about two-thirds, (for example, four feet), of the required depth, with the usual drill and drilling machine. The expanding drill is then employed in conjunction with the drilling machine to drill a "charge-pocket" or chamber B of larger diameter (in this example about three and one quarter inches), to the required depth (six feet). During this pocket forming operation, an inclined shoulder C is formed against which the tamping is compact by the explosive force of the blast, thereby effectively preventing a "blow out" of the charge. A chambered hole of this depth will be charged to a depth of about nineteen inches, leaving a space of about five inches at the top of the chamber to be filled with tampings. This places the full charge at the bottom of the hole, where it will produce the best results. In a comparative sense, a five-foot chambered blast-hole will produce the same results as a straight blast-hole of six foot depth.

The drill, as shown, is designed for use in connection with a rotary drilling machine, and has the spiral shank 1 merging into a flat portion 2, which terminates with a centering-bit 3. A pair of cutting jaws 4, 5, are disposed one on each side of the flat portion 2 of the shank and are pivotally connected thereto by the pivot bolt 6, which passes loosely through the jaw 5 and shank 2, and is screw threaded into the jaw 4, a lock-nut 7 being utilized to bind the jaw 4 to the bolt 6 after proper adjustment. The upper ends of the jaws are bifurcated and a stop pin 8, secured in the shank 2, projects on both sides thereof between the furcation 9 and serves to limit the movements of the jaws. The tool end of each jaw extends downwardly and is projected forwardly in the direction of drill rotation to the opposite side of the shank 2 and assumes the general shape of an elongated spiral, the inner cutting edge 10 conforming to and closely fitting the spiral groove of the centering-bit 3 when the jaws are in closed position. (See Figs. 2 and 4.) When in open or expanded position, (see Fig. 5), the lead point 11 of the transverse cutting edge 12 is in advance of the inner point 13; this in conjunction with the forward spiral sweep of the tool end producing a clean shear cut of the material. The spiral formation of the tool ends of the jaws also elevates the tailings toward the spiral shank 1 by which they are finally carried to the surface. The outer longitudinal edge of the tool end of each jaw is beveled as at 15 to form the cutting edge 14 and provide necessary cutter relief for free cutting action. The inner cutting edge 10 initially contours and subsequently acts upon a central cone D adjacent the bore of the centering-bit 3 which by the continuous inward feed induced by the drilling machine assists in opening and retaining the jaws in expanded position. Said cutting edge is formed by the bevel 16 which also provides cutter relief for free cutting action.

As the expanding movement of the jaws is transverse to the axis of drill rotation it is necessary, during said expanding movement, that the peripheral wall of the drill hole A be cut away proportionately as the drill expands. This is effectively accomplished by the outer longitudinal cutting edges 14 which extend from the lead points 11 upwardly to a point adjacent the pivotal center of the jaws. These outer longitudinal cutting edges form the inclined shoulder C during the expanding movement of the jaws.

An expanding movement of jaws having blunt or noncutting longitudinal edges, would be impossible as said blunt edges would contact with the peripheral wall of the drill hole, as a solid abutment, and any expanding tendency would thereby be nullified, therefore it is evident that a drill of the character herein illustrated can only expand proportionately as the peripheral wall of the drill hole is cut away.

The performance of the opening or expanding function of the jaws is dependent upon the disposition of the transverse cutting edges 12 of the tool ends thereof relative to the axis and plane of movement of the jaws in conjunction with the angle of the lines of resistance thereof relative to said axis.

To fully disclose what is meant by the term "line of resistance," I will assume that the drill is stationary and the material to be bored revolves about the vertical axis thereof. Now, with the jaws in closed position, as shown in Fig. 4, the lines of forces $a$ exerted against the lead points 11 of the transverse cutting edges 12 have a direction at right angles to the radius line $b$ and tangent to the circle $c$ of rotation. Reverting back to the actual conditions with the drill rotating and the material to be bored stationary, the above mentioned "lines of force" become the "lines of resistance" although their effective function remains the same, namely, the forcing of the jaws open in the direction of the lines of jaw movement $d$.

Correspondingly, the angle $e$ formed by the "line of resistance" $a$ and the axis $f$ is termed the "angle of resistance." The "line of resistance" $a$ is effective at all times to cause an expansion of the jaws until the "angle of resistance" $e$ is equal to or less than the angle of repose, which is 8° plus a coefficient of friction.

In Fig. 4, the "lines of resistance" $s$ of the inner points 13 of the transverse cutting edges 12 are approximately parallel to the lines of jaw movement $d$ and at right angles to the axis line $f$, and, therefore, said points are more efficient in promoting an opening movement of the jaws than the lead points 11, the comparative efficiency gradually decreasing from points 13 to points 11. However, the inner points 13 are not effective until they pass the periphery of the centering-bit 3 and contact with the material being bored.

Now, referring to Fig. 5, which shows the jaws in open or expanded position, it will be seen that the "angle of resistance" $h$ for the point 13 approximates the angle of repose. Therefore, the jaw opening function of the "line of resistance" $g$ is practically nilled. The "angle of resistance" $x$ of the lead point 11 has been reduced to approximately 30°, thereby reducing the effectiveness of the "line of resistance" $k$ to a degree just sufficient to retain the jaws in open position without submitting the stop pin 8 to excessive shearing strains. Thus, it will be seen that the particular disposition of the cutting edges 12 relative to the pivotal line $f$ of the jaws controls the opening or expanding movements of said jaws, and that the degree of effective jaw opening resistance decreases as the jaws move to their maximum expanded position thereby reducing the "angle of resistance."

If it is desired to chamber a blast-hole of larger diameter say 2¾", the jaws may be reversely mounted on the drill shank, as indicated by Fig. 6. Assembling the jaws in this manner increases the "angle of resistance" e of the lead point 11, thereby rendering the jaw opening movement more powerful to overcome the increased difficulty of opening in a blast-hole of large diameter.

Now, without referring to such intangible elements as "line of resistance" and "angle of resistance", it will be pointed out that the transverse cutting edges 12 are angularly disposed relative to the plane of jaw movement, to a degree greater than the angle of repose and that this angular disposition causes an automatic opening of the jaws.

This angular disposition of the transverse cutting edges may also be described as being relative to the pivotal axis of the jaws at an angle of 90° less an angle greater than the angle of repose.

This drill has been fully tested in actual mining operation and has been found to meet every requirement both as to quality of work, speed of operation and results obtained with the chambered blast-hole, the quantity of material reduced to a powdered state being materially reduced.

As an indirect result obtained by the use of my expanding drill for forming chambered blast-holes, attention is again directed to the reduced liability of a "blow-out" of the charge, with its accompanying danger to the blasting crew which sometimes extends to a fatal accident.

The preventing of these "blow-outs" elevates this invention out of the class of simple mechanical devices and into a class of safety appliances wherein the cardinal feature is the protection of the lives of the workmen.

Having described my invention, I claim:—

1. A device of the nature disclosed comprising a drill shank and a pair of cutting jaws pivoted on opposite sides thereof, a spiral center-bit formed integral with the drill shank and extending beyond the tool ends of the jaws, the inner edges of which are contoured to closely fit within the spiral groove of said bit when in closed position.

2. A device of the nature disclosed combining a drill shank, and a pair of oppositely disposed cutting jaws pivoted on said shank, each jaw having a plane body portion and a spiral cutter portion terminating with a cross-wise cutting edge, said cutter portion provided with opposite cutting edges longitudinally, each respectively converging to a point with said cross-wise cutting edge.

3. A boring bit composed of a plane body or shank portion and a spiral cutter portion terminating with a cross-wise cutting edge, said cutter portion provided with opposite cutting edges longitudinally, each respectively converging with said cross-wise cutting edge to a point.

4. A boring bit composed of a plane body or shank portion and a cutter portion formed to a degree of spirality and terminating with a cross-wise cutting edge, said cutter portion longitudinally along one side having a cutting edge converging with said cross-wise cutting edge to a point.

5. A boring bit composed of a plane body or shank portion and a cutter portion formed to a degree of spirality and terminating with a cross-wise cutting edge angularly disposed relative to the shank portion, said cutter portion longitudinally along one side having a cutting edge converging with said cross-wise cutting edge to form a projected lead point.

6. A device of the nature disclosed combining a drill shank, a pair of oppositely disposed cutting jaws pivoted on said shank, each jaw having a plane body portion and a spiral cutter portion terminating with a cross-wise edge, said cutter portion provided with opposite cutting edges longitudinally, each respectively converging to a point with said cross-wise cutting edge, and means for limiting to outward swing of said jaws upon said shank.

In witness whereof, I hereunto subscribe my name, as attested by the two subscribing witnesses.

JAMES W. JENNINGS.

Witnesses:
 CLARENCE B. FOSTER,
 L. A. BECK.